Sept. 15, 1931.    H. C. STAEHLE    1,823,706
HIGH TEMPERATURE THERMOCOUPLE
Filed Nov. 12, 1929
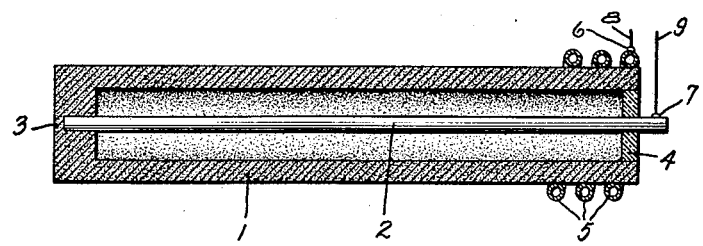
Inventor:
Henry C. Staehle.
by Charles E. Tullar
His Attorney Patented Sept. 15, 1931

1,823,706

UNITED STATES PATENT OFFICE

HENRY C. STAEHLE, OF BOULDER, COLORADO, ASSIGNOR TO GENERAL ELECTRIC COMPANY, A CORPORATION OF NEW YORK

HIGH TEMPERATURE THERMOCOUPLE

Application filed November 12, 1929. Serial No. 406,712.

This invention relates to a new and improved high temperature thermocouple.

Heretofore it has been difficult to obtain a satisfactory high temperature thermocouple since few thermocouples are capable of withstanding for any length of time temperatures above 1600° C.

I have discovered that I can obtain a satisfactory high temperature thermocouple which will have comparatively long life and uniform E. M. F. resistance at the high temperatures at which it is used, if I employ tantalum carbide and graphite as the elements of the thermocouple. Because of its extreme infusibility tantalum carbide is capable of withstanding very high temperatures and in conjunction with graphite forms a thermocouple which can effectively measure temperatures as high as, and over, 2000° C. Since tantalum carbide melts at over 4000° C., and since graphite can withstand temperatures up to at least 2500° C., the range within which the thermocouple can operate is very great. Also tantalum carbide will not recrystallize or become brittle at high temperatures.

Referring to the drawing accompanying and forming part of this application, the single figure there shown is a diagrammatic cross-sectional view of an embodiment of my invention.

In order to illustrate my invention I have shown in the figure of the drawing my new and improved thermocouple constructed in pencil type form. However, it will be obvious that the structure may be modified without departing from the spirit or scope of the invention. The tube 1 is formed of graphite and is one element of the thermocouple. This graphite tube receives at one end the tantalum carbide element which forms the other element of the thermocouple. This element may take the form of a wire 2, as shown. The end 3 constitutes the hot junction of the thermocouple. The tantalum carbide wire is spaced from the walls of the graphite tube and while it is in itself sufficiently rigid at the high temperatures employed, it may be held in place if desired by an insulating plug 4 which may be formed of any inert insulating material, such as zirconia or thoria. Where the thermocouple is of a relatively small length the cold junction thereof may be kept cool by means of several turns of copper tubing 5 suitably fixed to the graphite tube 1 through which tubing a cooling fluid such as water is circulated. Where the length of the thermocouple is such that there is no danger of the cold end becoming heated this copper tubing arrangement may be dispensed with. If it is used, however, contact may be made if desired to the graphite through the copper tubing as shown at 6, and contact with the tantalum carbide wire is made at 7. These contacts 6 and 7 may be connected by means of suitable leads, 8 and 9, respectively, to any suitable measuring instrument such as a millivolt meter or a potentiometer.

A thermocouple of the type shown and described was found to develop an E. M. F. of approximately 1 millivolt per 100° C. difference. A temperature of about 2000° C. as checked by an optical pyrometer was recorded, although this is not the maximum temperature at which the thermocouple of my invention may be used. At this temperature the tantalum carbide was not affected nor was there any indication of sag in the length used.

What I claim as new and desire to secure by Letters Patent of the United States is:

A thermocouple the elements of which are tantalum carbide and graphite, respectively.

In witness whereof, I have hereunto set my hand this 5th day of November, 1929.

HENRY C. STAEHLE.